Aug. 15, 1944.　　　　A. Y. DODGE　　　　2,355,710
CLUTCH
Filed May 13, 1940　　　　2 Sheets-Sheet 1

INVENTOR
ADIEL Y. DODGE
BY McConkey and Booth
ATTORNEYS.

Patented Aug. 15, 1944

2,355,710

UNITED STATES PATENT OFFICE 2,355,710

CLUTCH

Adiel Y. Dodge, Rockford, Ill.

Application May 13, 1940, Serial No. 334,706

8 Claims. (Cl. 192—103)

This invention relates to clutches and more particularly to clutches whose engagement and disengagement is controlled in response to speed.

One of the objects of the invention is to provide a clutch whose engagement is controlled by centrifugal weights connected to the clutch engaging members to operate the same. The weights are preferably connected to the clutch members through a linkage so as to operate the members in accordance with a function of the centrifugal force of the weights.

Another object of the invention is to provide a speed responsive clutch whose engagement and disengagement will occur at different speeds.

Another object of the invention is to provide a speed responsive clutch which may be held out of engagement manually when desired.

Still another object of the invention is to provide a speed responsive clutch for connecting two shafts whose engagement is controlled in accordance with the speed of a third shaft or rotating member.

While there have been numerous automatic clutches responsive to centrifugal force proposed, none of these has been entirely satisfactory for all driving conditions. Where a centrifugal clutch is desired to engage and handle a considerable amount of torque at low speeds, the amount of weight required acting directly on the friction members is excessive. Therefore, it becomes desirable to devise weights which have a large mechanical advantage thereby multiplying the centrifugal force to attain a large force for actuating the friction members.

To further reduce the necessity of excessive weight, I have incorporated a self-actuating feature in the friction member design, so that the tangential friction load on the clutch members tends to cause the friction member to engage rather than disengage.

In addition to the above, I have provided a link between the weight and the friction member which imparts relatively rapid movement to the friction shoe members during the first part of their movement to quickly take up clearance during which movement the angle of the linkage changes in such a way as to increase the mechanical advantage of the weight acting to engage the friction shoe member. This accomplishes two things. In addition to increasing the application force at the time needed, it permits the weight to assume a position further from the center, thus increasing the centrifugal force generated thereby. In order to provide a more simple and rugged structure, I pivot the centrifugal actuating weights upon the same pins which act as anchor pins for the friction shoe members. This both simplifies the structure and acts in a manner to support the anchor pins since the combined force imposed by the weights and its linkage is in a large degree opposed to the force imposed upon the pin by the opposite shoe member when transmitting torque.

Inherent to all centrifugally actuated clutches there exists a tendency to produce excessive slip under the conditions of slowly increasing speed above the predetermined speed at which they engage. If the device in question has a tendency to be decelerated by the engagement of the clutch, this inherent characteristic becomes excessive. In order to overcome this objection, I have provided means which produce a continually increasing engaging force as the movement of engagement takes place. In addition thereto, I have provided linkage which produces an increasing force opposing a yieldable disengaging force, such as a spring, increasing in its opposition as the clutch becomes engaged.

Sometimes it is desirable to place a friction clutch behind a hydraulic drive unit. This location may be preferred in order to reduce the revolving mass ahead of the gears which are to be shifted, when the friction clutch is disengaged. When an automatic clutch of the usual type, which is responsive to the speed of the driving clutch element is so placed, its response to some predetermined speed of rotation is upset due to slip which takes place in the hydraulic unit. This is objectionable because both the hydraulic unit and the friction clutch slip, this increasing the total amount of slip.

To overcome this objection I have produced an automatic clutch responsive to centrifugal force suitable for locating back of a hydraulic unit which does not have the objectionable characteristics aforementioned. In my clutch the governing centrifugal weights turn at engine speed. Therefore, any slip which takes place in the hydraulic unit has no effect upon their action.

The above and other objects, advantages and novel features of the invention will be apparent from the following description of the accompanying drawings, in which.

Figure 1:
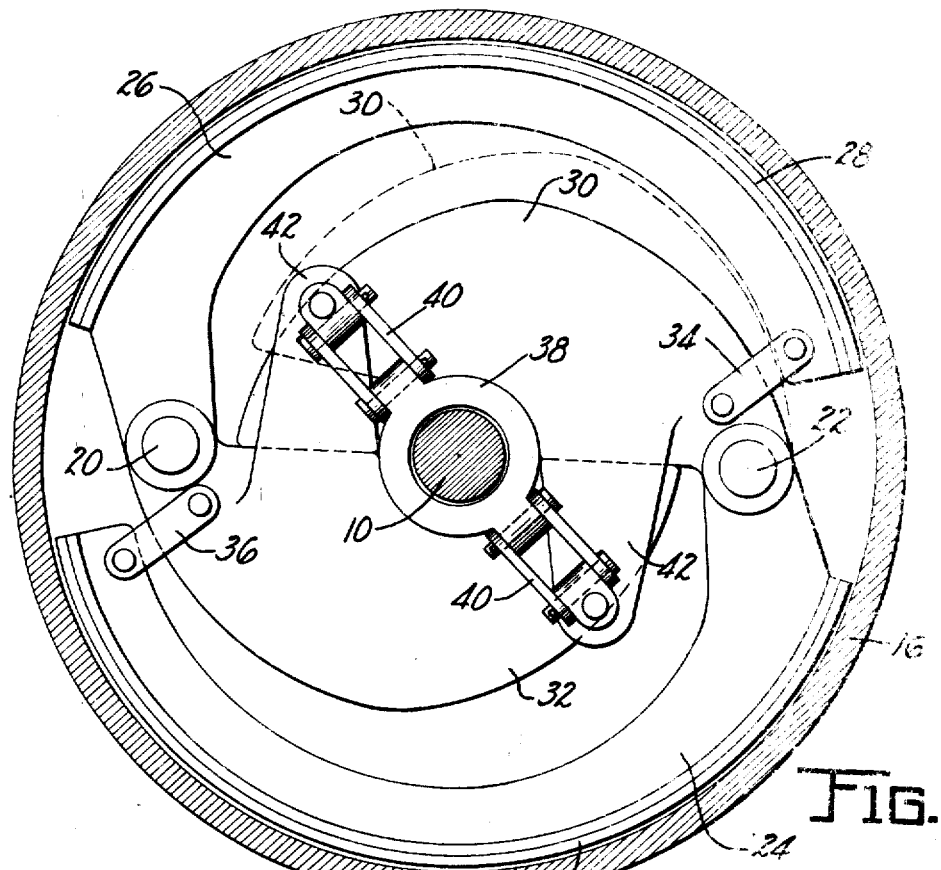
Figure 1 is an end view of a clutch embodying the invention with parts omitted.
Figure 2:
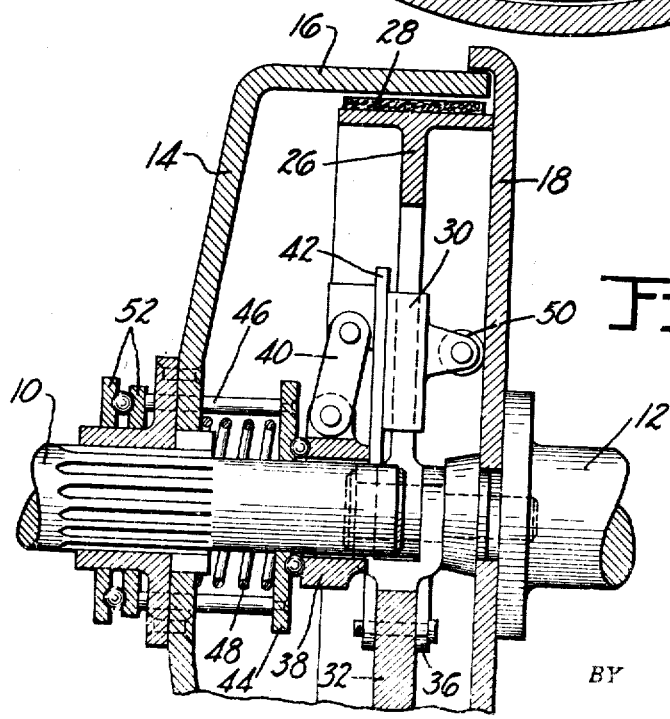
Figure 2 is a partial axial section of Figure 1.

In Figures 1 and 2 the clutches are shown connecting two shafts 10 and 12 and comprises a friction drum 14 connected to the shaft 10 and having an axial flange 16. A plate 18 secured to the shaft 12 closes the drum 16 and carries a pair of pivot pins 20 and 22 on which friction shoes 24 and 26 are mounted. As shown, the shoes 24 and 26 are of substantial arcuate extent and are faced with a friction lining 28 to engage the flange 16, and are pivoted at one end on each of the pins 22 and 20 respectively.

The friction shoes are operated by weights 30 and 32 pivoted respectively on the pins 22 and 20. The weight 30 is connected adjacent the pin 22 by links 34 with the free end of the friction shoe 26, and the weight 32 is similarly connected by links 36 to the free end of the shoe 24. During rotation of the shaft 12 and plate 18 the weights tend to fly out as indicated by the dotted position of weight 30 in Figure 1, to move the free ends of the shoes into driving engagement with the flange 16. If the flange tends to overrun the shoes in a counterclockwise direction, as seen in Figure 1, the friction drag of the shoes will urge them into tighter engagement with the flange to provide positive driving connection, but if the flange tends to turn in the opposite direction the shoes will grip it with a smaller force.

In order to hold the shoes normally out of engagement with the flange a collar 38 is slidably mounted on the shaft 10 and is connected by links 40 with projections 42 on the weights 30 and 32. The collar is urged to the right as seen in Figure 2 through a plate 44 engaging the collar through a suitable bearing and slidably carried by pins 46 extending through the drum 14. A coil spring 48 engages the plate 44 to urge it to the right.

Movement of the collar 44 to the right tends to move the links 40 toward a radial position and acts on the projection 42 to draw the weights 30 and 32 inwardly. As centrifugal force on the weights increases they will be thrown outwardly to move the collar 44 to the left against the spring 48 and to force the shoes into engagement with the drum. The weights 30 and 32 may be provided with guide rollers 50 engaging the flange 18 to absorb the thrust of the links 40. Due to this arrangement, and to the fact that the links 40 change their angle as the collar 38 moves on the shaft, the spring 48 exerts a larger force on the weights when collar 38 is in its right-hand position than when it has been moved to the left. Thus a higher speed is required to overcome the spring force when the shoes are out of engagement with the flange than to hold the shoes in engagement with the flange once they are engaged therewith. In this way chattering of the shoes is prevented and once they have started to move into engagement with the flange they will move into full engagement therewith.

In order that the clutch may be held in disengaged position when desired, the pins 46 are provided outside of the drum 14 with collars 52 connected by a thrust bearing. Manually controllable means, such as a yoke, may engage the outer collar 52 to press the plate 44 to the right so as to augment the force of spring 48 and to hold the clutch out of engagement regardless of the speed of the shaft 12.

Figure 3:
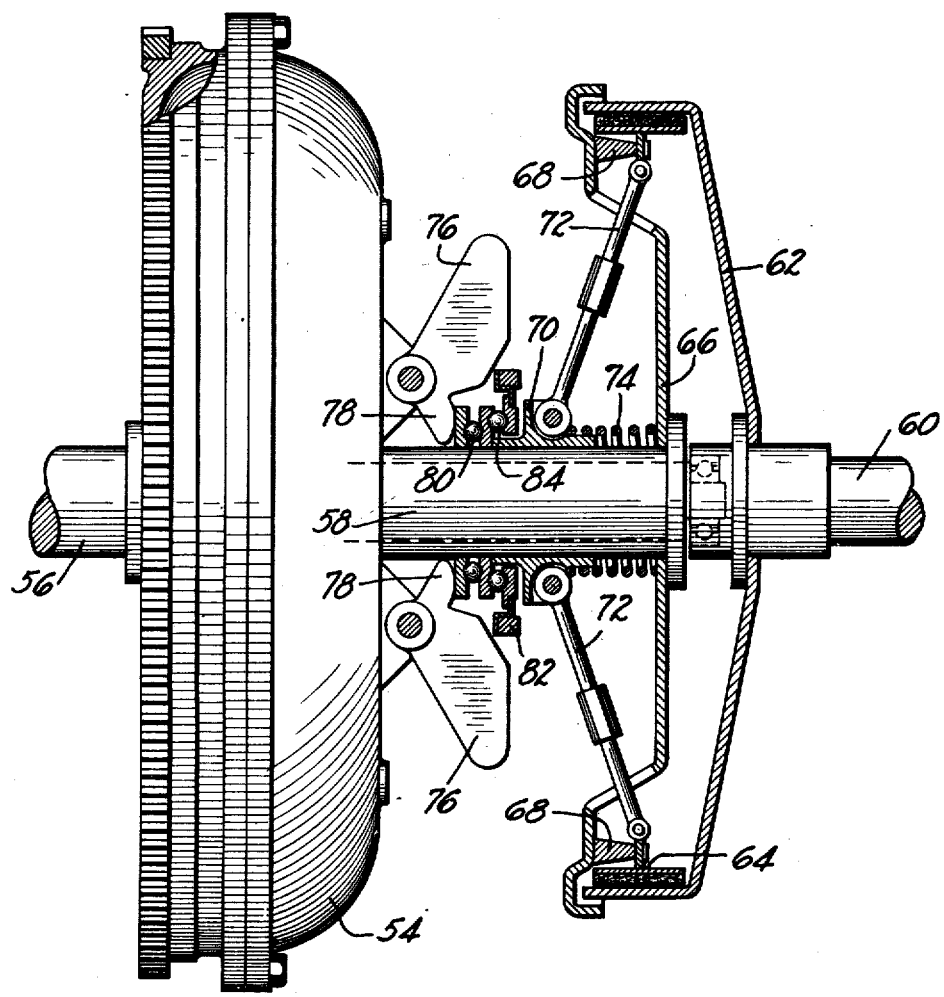
Figure 3 is a side elevation with parts in section of another clutch embodying the invention.

Figure 3 illustrates a similar clutch for use in connection with a variable speed driving element 54 having a driving member connected to a shaft 56 and a driven member driving a shaft 58. The driving unit 54, as shown, may be any variable speed type unit, but is illustrated as a hydraulic coupling in which the driven member and shaft 58 are driven at variable speeds from the driving member. In connection with devices of this type it may be desirable to connect the driven member to a shaft to be driven at some predetermined speed of the driving member, for example, to permit an engine connected to the driving member to reach a predetermined minimum speed before it is subjected to any load. The construction of Figure 3 is particularly adapted for this purpose.

As shown, a shaft 60 to be driven carries a drum 62 which may be engaged by friction shoes 64 carried by a plate 66 on the shaft 58. The construction of the shoes 64 is not shown in detail, but it may be the same as that illustrated in Figure 1.

The shoes are guided by guide projections 68 carried by the plate 66 and may be pivoted to the plate in the manner of the shoes of Figure 1.

A collar 70 slidable on the shaft 58 is connected to the shoes 64 by links 72. A coil spring 74 urges the collar to the left in a direction to move the shoes out of engagement with the drum 62.

The collar 70 is urged to the right to engage the shoes with the drum by centrifugal weights 76 eccentrically pivoted to the outer driving casing of the unit 54. The weights 76 have cam projections 78 pressing against bearings 80 which engage the collar 70. In operation, the weights 76 will respond to the speed of the driving shaft 56 and will urge the collar 70 to the right to force the friction shoes 64 into engagement with the drum 62. Thus engagement of the clutch is controlled in response to the speed of a driving member which is separate from either of the shafts to be connected by the clutch.

In order to hold the clutch out of engagement when desired, a thrust ring 82 is connected through a bearing 84 to the collar 70. The thrust ring 82 may be urged to the left manually in any desired manner.

While two embodiments of the invention have been illustrated and described in detail it will be understood that they show examples only and are not intended to define the scope of the invention, reference being had for this purpose to the appended claims.

What is claimed is:

1. A clutch for connecting two shafts comprising a drum carried by one of the shafts, a plate carried by the other shaft, a pair of arcuate friction shoes pivoted at one end on the plate and movable into engagement with the drum, a pair of weights eccentrically pivoted on the plate and linked to the free ends of the shoes to move them into engagement with the drum in response to centrifugal force, a collar slidable axially on one of the shafts, extensions on the weights lying on the opposite sides of radial lines through the pivot points of the weights than the weights respectively, links connecting the collar to the extensions, and resilient means urging the collar in a direction to move the weights inwardly in opposition to centrifugal force thereon.

2. A clutch for connecting two shafts comprising a drum member connected to one of the shafts, a plate carried by the other shaft, an arcuate friction shoe pivoted at one end on the plate and movable into engagement with the drum member, a collar slidable axially on one of the shafts, a link pivoted at one end to the collar, a mechanism including means pivoted to the other end of the link for connecting said other end of the link to the free end of the friction shoe and guiding it for movement in a plane parallel to the plate, whereby as the collar is shifted the angle of the link will change, the link and connecting mechanism being so constructed and arranged that the link becomes more nearly radial as the shoe moves out of engagement with the drum, and means acting on the collar to urge it in a direction to disengage the shoe from the drum.

3. A clutch for connecting two shafts comprising a drum member connected to one of the shafts, a plate carried by the other shaft, an arcuate friction shoe pivoted at one end on the plate and movable into engagement with the drum member, a weight eccentrically pivoted on the plate, a link pivotally connected at its opposite ends to the weight and to the free end of the shoe, said link changing its angle as the weight and shoe move to increase the mechanical advantage of the weight acting on the shoe as the shoe is moved into engagement with the drum, a collar slidable axially of the shafts, a link pivotally connected to the collar and the weight in such a way that movement of the collar toward the weight moves the weight in toward the axis of the shafts, and means for moving the collar toward the weight to disengage the clutch.

4. A clutch for connecting two shafts comprising a drum connected to one of the shafts, a plate carried by the other shaft, pivot pins on the plate at diametrically opposite points, an arcuate friction shoe and a centrifugal weight pivoted on each of the pins and extending generally toward the other pin, and links connecting the free ends of the shoes respectively to the weights pivoted on the opposite pivot pin whereby the weights actuate the shoes and create reaction forces on the pivot pins tending to balance the pressure of the shoes thereon.

5. A clutch for connecting two shafts comprising a drum carried by one of the shafts, a supporting member carried by the other shaft adjacent the drum, a friction shoe movably mounted on the supporting member, and movable into engagement with the drum in response to centrifugal force, a spring, and mechanism operatively connecting the spring to the friction shoe and including a link which changes its angle relative to the shaft axis as the shoe moves to give the shoe a greater mechanical advantage over the spring when the shoe is near its engaged position than when it is near its disengaged position.

6. A clutch for connecting two shafts comprising a drum carried by one of the shafts, a supporting member carried by the other shaft adjacent the drum, a friction shoe movably mounted on the supporting member, a weight eccentrically pivoted on the supporting member, means connecting the weight to the shoe to move the shoe into engagement with the drum as the weight moves out in response to centrifugal force, a spring, and mechanism operatively connecting the spring to the weight and including a link which changes its angle relative to the shaft axis as the weight moves out to give the weight an increasing mechanical advantage over the spring as the weight moves out.

7. A clutch for connecting two shafts comprising a drum member connected to one of the shafts, a plate carried by the other shaft, pivot pins at diametrically opposite points on the plate, an arcuate friction shoe and a centrifugal weight pivoted on each of the pins and extending generally toward the other pin, links pivotally connected at their opposite ends respectively to the weights adjacent their pivot pins and to the free ends of the shoes pivoted on the other pivot pin, said links lying at a relatively small angle to a radius through them when the shoes are out of engagement with the drum and increasing their angle as the weights and shoes move to increase the mechanical advantage of the weights acting on the shoes as the shoes are moved into engagement with the drum.

8. A clutch for connecting two shafts comprising a drum carried by one of the shafts, a supporting member carried by the other shaft adjacent the drum, a friction shoe movably mounted on the supporting member, and movable into engagement with the drum in response to centrifugal force, a collar movable on one of the shafts, means including a link connecting the collar to the friction shoe, and a spring acting on the collar urging it in a direction to move the shoe out of engagement with the drum, the link being so connected that its angle relative to the spring changes to give the shoe a greater mechanical advantage over the spring when the shoe is near its engaged position than when it is near its disengaged position.

ADIEL Y. DODGE.